(12) United States Patent
Serna, Jr.

(10) Patent No.: US 6,906,800 B2
(45) Date of Patent: Jun. 14, 2005

(54) POLARIMETER USING QUANTUM WELL STACKS SEPARATED BY GRATINGS

(75) Inventor: Mario A. Serna, Jr., Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 285 days.

(21) Appl. No.: 10/389,334

(22) Filed: Mar. 14, 2003

(65) Prior Publication Data

US 2004/0179198 A1 Sep. 16, 2004

(51) Int. Cl.$^7$ ................................................. G01J 4/00
(52) U.S. Cl. ...................................... 356/366; 356/368
(58) Field of Search ................................ 356/364–370

(56) References Cited

U.S. PATENT DOCUMENTS

| | | |
|---|---|---|
| 3,700,334 A | 10/1972 | Low et al. |
| 4,943,144 A | 7/1990 | Delacourt et al. |
| 5,005,977 A | 4/1991 | Tomoff |
| 5,045,701 A | 9/1991 | Goldstein et al. |
| 5,081,348 A | 1/1992 | Siddiqui |
| 5,485,015 A | 1/1996 | Choi |
| 5,528,051 A | 6/1996 | Nuyen |
| 5,552,603 A | 9/1996 | Stokes |
| 5,646,421 A | 7/1997 | Liu |
| 6,043,887 A | 3/2000 | Allard et al. |
| 6,133,571 A | 10/2000 | Dodd |
| 6,177,995 B1 | 1/2001 | Compain et al. |
| 6,355,939 B1 | 3/2002 | Dodd |
| 6,410,917 B1 | 6/2002 | Choi |
| 6,490,043 B1 | 12/2002 | Kebabian |
| 6,521,967 B1 | 2/2003 | Bandara et al. |
| 2002/0094597 A1 * | 7/2002 | Lin et al. ........................ 438/57 |
| 2004/0038503 A1 * | 2/2004 | Fu et al. ....................... 438/511 |
| 2004/0095627 A1 * | 5/2004 | Ahearn et al. ............... 359/240 |

OTHER PUBLICATIONS

D. W. Beekman and J. Van Anda, "Polarization sensitive QWIP thermal imager," *Infrared Physics & Technology*, vol. 42, pp. 323–328 (2001).

S. Sposato, et al., "Two long–wave infrared spectral polarimeters for use in understanding polarization phenomenology," *Optical Engineering*, vol. 41, No. 5, pp. 1055–1064 (May 2002).

F. Sadjadi and C. Chun, "Improved Feature Classification by Means of a Polarimetric IR Imaging Sensor," *1996 International Geoscience and Remote Sensing Symposium*, vol. 1, pp. 396–398 (May 1998).

(Continued)

*Primary Examiner*—Michael P. Stafira
(74) *Attorney, Agent, or Firm*—James M. Skorich

(57) ABSTRACT

Quantum well stacks are used in combination with linear gratings to determine the degree of polarization of incident light in terms of Stokes parameters. Interference from multiple reflections, diffractions and transmissions of the light propagating from and through the linear gratings modulates the absorption of the ±1-diffracted orders at each quantum well stack.

Each quantum well stack is included in separate circuit having a voltage bias and a current meter. The voltage bias across each circuit is individually adjusted, and the photocurrent in each circuit, as measured by the respective current meter, is proportional to the flux of light absorbed by the respective quantum well stack. The four photocurrents are linearly mapped to the four Stokes parameters, which, in turn, represent the polarization of the incident light.

16 Claims, 4 Drawing Sheets

OTHER PUBLICATIONS

F. J. Iannarilli, Jr., et al., "Polarimetric–Spectral Intensity Modulation (P–SIM): Enabling simultaneous hyperspectral and polarimetric imaging," *SPIE*, vol. 3698, pp. 474–481 (Apr. 1999).

L. Wendler and T. Kraft, "Theory of grating–coupler–assisted infrared spectroscopy of lower–dimensional electron systems: Local optics of anisotropic multiplayer systems with grating," *Physica B*, vol. 271, pp. 33–98 (1999).

J. Y. Andersson and L. Lundqvist, "Grating–coupled quantum–well infrared detectors: Theory and performance," *Journal of Applied Physics*, vol. 71, No. 7, pp. 3600–3610 (Apr. 1, 1992).

Y.–L. Kok and N. C. Gallagher, "Relative phases of electromagnetic waves diffracted by a perfectly conducting rectangular–grooved grating," *Journal of the Optical Society of America A*, vol. 5, No. 1, pp. 65–73 (Jan. 1988).

* cited by examiner

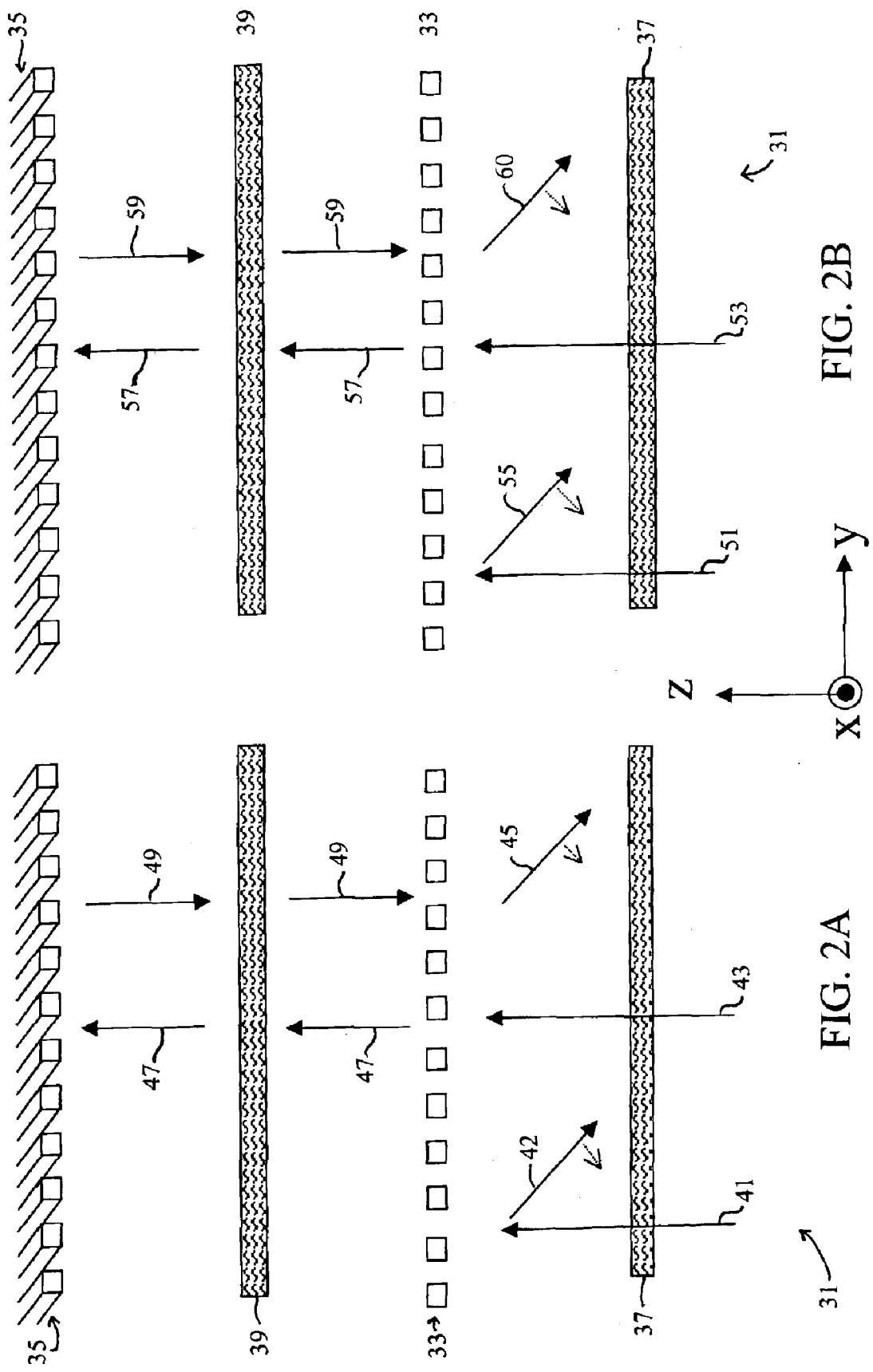

POLARIMETER USING QUANTUM WELL STACKS SEPARATED BY GRATINGS

STATEMENT OF GOVERNMENT INTEREST

The conditions under which this invention was made are such as to entitle the Government of the United States under paragraph l(a) of Executive Order 10096, as represented by the Secretary of the Air Force, to the entire right, title and interest therein, including foreign rights.

BACKGROUND

In an intensity image, each pixel responds with a change in voltage of current due to arrival of light at a given wavelength on the focal plane, e.g., no voltage for no light impinging the pixel, some voltage (for some light) or maximum voltage (for maximum intensity). Associating a color or degree of black with the reported voltages forms an image. For example, the low light pixels become black, the pixels with some light become gray, and the pixels with excessive light appear white.

In a polarimetric image, each pixel also provides the polarization state of the incident light incident on that pixel. The polarization state is given by the intensity plus three additional values indicating the fraction of the light that was polarized, the axis of polarization, and whether the polarization is rotating in time. Polarimetric imaging thus provides more information than intensity imaging.

Polarimetric imaging is particularly useful in discerning man-made objects because they typically have a higher degree of polarization, hereinafter referred to as "DOP," than natural objects. Polarization information also provides information regarding the surface roughness and orientation of an object that is not readily available from an intensity image. It has also been used to advantage in remote sensing, automatic target recognition, identifying materials, and distinguishing objects from a cluttered background.

Polarimetric data is often represented in terms of the four Stokes parameters, $S_0$, $S_1$, $S_2$, and $S_3$. These parameters represent all the polarization information, and are defined as follows:

$S_0 = I_0 + I_{90}$, $S_1 = I_0 - I_{90}$, $S_2 I_{45} - I_{135}$, and $S_3 = I_R - I_L$ where $I_x$ is the measured intensity of the light after passing through a linear filter at an orientation of X degrees, and $I_R$ and $I_L$ are the measured intensities of the right or left circularly polarized fraction of the light.

The DOP, in terms of Stokes parameters, is given by $DOP = \sqrt{S_1^2 + S_2^2 + S_3^2}/S_0$ Imaging polarimeters of the prior art typically collect several different images of the same object, with the light emanating from the object passing through a different polarization filter in each image. A variation described in U.S. Pat. No. 5,045,701 uses a rotating quarter-wave plate with a linear filter. With a single focal plane, this device takes several images at different rotations, respectively, of the polarizing filter. The collected images are averaged and subtracted to extract the four Stokes parameters at each pixel. To perform the subtraction, one registers pixels from the different images that represent the same point in the scene. However, because the images are taken at different times, any motion in the image will cause a registration error. This precludes the use of this apparatus to obtain polarimetric images of terrestrial objects from moving platforms, such as airplanes or orbiting satellites, or images of objects that are translating or rotating with respect to the apparatus.

Another approach uses four separate cameras with a different polarization filter on each camera. The four cameras take simultaneous images of the same scene. Again, the appropriate images are added and subtracted to extract the four Stokes parameters; however, parallax and camera misalignment will introduce registration errors into the derived image.

A third approach to polarization detection capitalizes on the polarization-dependent absorption of quantum wells, and is described by D. W. Beekman and J. Van And a, "Polarization Sensitive QWIP Thermal Imager," *Infrared Physics and Technology*, Vol. 42, pp. 323–328 (2001). As will subsequently be discussed in detail, a quantum well with a linear grating can detect the component of incident light with the electric field perpendicular to the grooves of the grating. On a single focal plane, one makes neighboring pixels sensitive to vertical, horizontal or diagonal polarizations. Again, one adds or subtracts the images taken by the pixels sensitive to the different polarizations. Because the pixels being added and subtracted for each polarization image spatially neighboring points in the scene, sharp edges or bright points register as erroneous polarization.

The final example is called a polarimetric spectral intensity modulation spectropolarimeter, and is described in U.S. Pat. No. 6,490,043. This device measures the polarization of a single point in a scene by modulating the spectrum of the light with the polarization of the light and then measuring the spectrum of the light. In order to find the polarization one must compare the modulated spectrum to the true spectrum. Because the true spectrum is not known, approximations must be made that necessarily sacrifice polarimetric and spectral accuracy and precision in favor of pixel registration.

As shown by the foregoing discussion, there is a need in the art for a polarimeter capable of providing polarized images of an object that is translating or rotating relative to the position or orientation of the focal plane without sacrificing spectral or polarimetric accuracy and precision. The present invention fulfills this need in the art.

SUMMARY

Quantum well stacks are used in combination with linear gratings to determine the degree of polarization of incident light in terms of Stokes parameters. Interference from multiple reflections, diffractions and transmissions of the light propagating from and through the linear gratings modulates the absorption of the ±1-diffracted orders at each quantum well stack. The quantum wells, and thus the quantum well stacks, do not absorb light having an electric field polarized component in a plane parallel to the quantum well stacks. The non-absorbed propagating light is reflected, diffracted and transmitted at each grating as a function of its polarization. Interference translates the incident polarization into the amount of polarized light having a magnetic field lying entirely in the x-y plane, diffracted into the ±1 orders at each grating. The aforementioned ±1 orders are absorbed by the quantum wells.

Each quantum well stack is included in separate circuit having a voltage bias and a current meter. The voltage bias across each circuit is individually adjusted, and the photocurrent in each circuit, as measured by the respective current meter, is proportional to the flux of light absorbed by the respective quantum well stack. The four photocurrents are thus a measure of the polarization of the incident light ultimately absorbed by each of the four quantum well stacks. More particularly, the four currents are linearly mapped to the four Stokes parameters, which, in turn, represent the polarization of the incident light.

Other aspects and advantages of the present invention will become apparent from the following detailed description, taken in conjunction with the accompanying drawing, illustrating by way of example the principles of the invention.

BRIEF DESCRIPTION OF THE DRAWINGS

FIGS. 2A and 2B are schematic drawings showing the paths of several light rays through a quantum well photodetector comprised of two quantum well stacks interspersed with a two linear gratings.

DETAILED DESCRIPTION

Figures 1A, 1B:
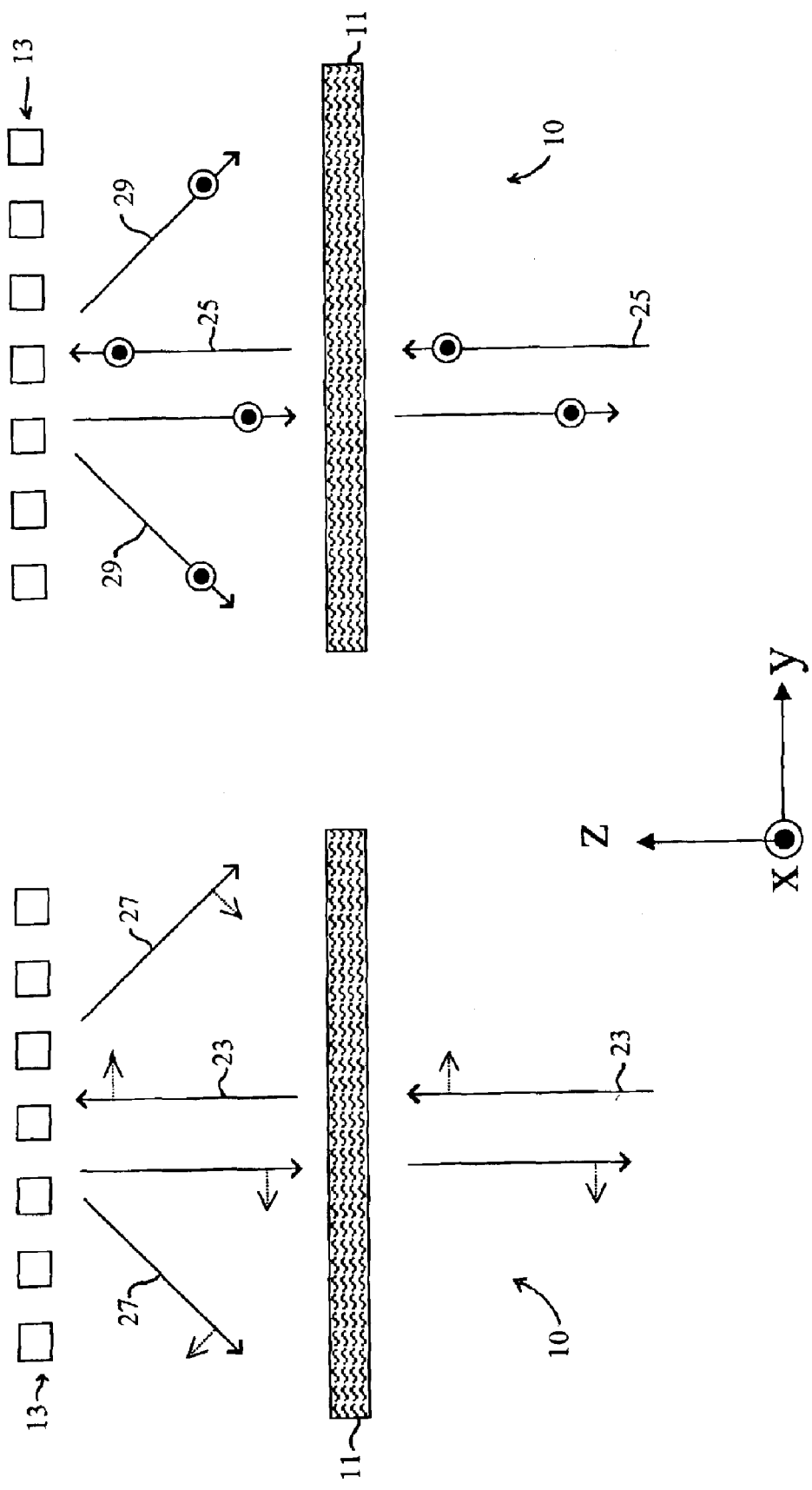
FIGS. 1A and 1B are schematic drawings showing the paths of several light rays through a quantum well photodetector of the prior art, comprised of a single quantum well stack with a single linear grating.

To explain the principle underlying the polarization detection, consider quantum well photodetector 10 of the prior art, including single quantum well stack 11 with a single linear grating 13, and quantum well photodetector 31 comprising a simplified embodiment of the present invention with just two quantum well stacks 37, 39 and two linear gratings 33, 35.

EXAMPLE ONE

As shown in FIGS. 1A and 1B, photodetector 10 detects the presence or absence of the 90° polarized (y-axis) component of incident light. Linear grating 11 has a 0° orientation (x-axis). The incident light is traveling in the z direction to within a few degrees. The device works because of two physical principles: quantum well stack 11 will only absorb the component of light with the electric field polarized perpendicular to the plane of the quantum wells, and normally-incident light initially polarized with an electric field parallel to gratings 13 will always be scattered into light whose electric field is also polarized parallel to the gratings.

Photo detector 10 will absorb the 90° polarized component of the incident light, and will not absorb its 0° polarized component. The measured photocurrent is proportional to the amount of light absorbed. 90° polarized incident light 23 impinges photo detector 10 detector from below. The dotted arrow represents the polarization of the electric field. Because the electric field of light 23 is parallel to the quantum well plane, the quantum well stack 11 will not absorb light 23 or 25 as it first passes through quantum well stack 11.

As shown in FIG. 1A, after hitting grating 13, some of light 23 will be scattered into light 27. Light 27 has an electric field component perpendicular to the quantum well plane, i.e., parallel to the z-axis, and the perpendicular component is absorbed by the quantum well stack 11, generating a photocurrent.

In contrast, as shown in FIG. 1B, incident light 25 is initially polarized with the electric field parallel to gratings 13, i.e., parallel to the x-axis. Again, the electric field of light 25 is parallel to the quantum well plane and is not absorbed by quantum well stack 11 as it first passes there through. Light 25 will scatter from grating 13 into light 29, whose electric field remains parallel to grating 13. Because light 29 is polarized with the electric field parallel to the quantum well plane, light 29 is not absorbed by quantum well stack 11 even after being diffracted. Because light 29 is not absorbed by quantum well stack 11, no photocurrent will be generated.

In this manner, the photocurrent across quantum well stack 11 provides a measure of the 90° polarized component of the incident light. However, many polarizations of light have 50 percent of the incident light in a 90° polarized component. For example, 45° linearly polarized, 135° linearly polarized, right circularly polarized, left-circular polarized, and unpolarized light each has exactly 50 percent of the light in a 90° polarized component. Quantum well photo detectors of the prior art comprised of a single quantum well and a single grating cannot distinguish between any of these cases.

EXAMPLE TWO

Quantum well photodetector 31, shown in FIGS. 2A and 2B, is a simplified embodiment of the present invention with only two gratings 33, 35 and two quantum well stacks 37 and 39. Grating 35 is rotated 45° about the z-axis relative to grating 33. Just as in the first example, first grating 33 enables one to measure the presence or absence of the 90° polarized component of the incident light; However, the addition of second grating 35 creates interference that will allow the photocurrent across quantum well stack 37 to distinguish between 45° and 135° polarization.

To predict the total polarization from the total fraction of the light absorbed by each of the four quantum well stacks of the present invention, one would need to follow and interfere four different incident polarizations of incident light through the multiple diffractions at each of the four layers of the device resulting in thousands of beams of light. For the purpose of understanding the principle of operation, consider only interference of two paths of light towards absorption by quantum well stack 39. The two paths will be tracked for both 45° polarized and 135° polarized incident light. The result will show that interference between the two paths is different for 45-degree polarized light than for 135-degree polarized light, resulting in a change in photocurrent across well stack 37 that provides a means to distinguish between the two polarizations. With the foregoing understanding, one reasonably skilled in the art of electromagnetic simulation would be able to use a computer simulation to track these thousands of diffractions for the purpose of designing a device to measure the polarization at a predetermined wavelength.

First, in reference to FIG. 2A, consider 45° polarized incident light 41 and 43 with an initial phase of 180°. Since light 41 and 43 are normally incident and are polarized in the x-y plane, quantum well stack 37 cannot absorb either. Interference exists between two possible paths that light 41 and 43 may take, respectively. The interference is found by following light 41 and light 43, which are in principle the same photon, through their two different paths. The phase shifts during reflection, diffraction, transmission and reflection are calculated by a computer code based on principles of physics well known to those reasonably skilled in the art.

The first path consists of a diffraction of light 41 from grating 33 into light 42. After diffraction, the component of light 42 polarized in the y-z plane has a phase of 105°.

The second path consists of the transmission of light 43 through grating 33 to form light 47. Transmission through grating 33 causes the light to become somewhat elliptically polarized with a major axis along the 45° orientation. The component of the light polarized in the y-z plane has a phase of −90°. The propagation of light 47 from grating 33 to grating 35 advances the phase by 400 degrees. At grating 35, light 47 reflects into light 49 with a phase of 415°. The magnitude and the phase shift in the light after reflection from a linear grating is highly dependent on the polarization of the light with respect to the grating.

Light 49 advances another 400° in phase while propagating back towards grating 33. Near grating 33, the component of light 49 polarized in the y-z component has a phase of 815°. After light 49 forward diffracts from grating 33, light 49 becomes light 45 with a phase of 915°, which is equivalent to 105°+90°.

Since the component of light 42 and 45 polarized in the y-z plane has a component parallel to the z-axis, quantum well stack 37 will absorb the light and generate a photocurrent. The absorption by quantum well stack 37 is proportional to the vector sum of light 42 and 45. The two paths have a phase difference of 90°, and therefore the two paths do not interfere constructively or destructively. This leads to a measurable amount of photocurrent across quantum well stack 37.

Referring to FIG. 2B, next consider 135° polarized incident light 51 and 53 with an initial phase of 180°. Since light 51 and 53 are normally incident and polarized in the x-y plane, quantum well stack 37 cannot absorb the light. Again, interference exists between two possible paths that the photon may take. The interference is found by following light 51 and light 53, which are in principle the same photon, through two different paths.

The first path consists of a diffraction of light 51 from grating 33 to form light 55. The component of light 55 polarized in the y-z plane will have a phase of 105°.

The second path consists of the transmission of light 53 through grating 33 to form light 57. After transmission through grating 33, light 57 is slightly elliptically polarized with a major axis along the 135° orientation. The component of the light polarized in the y-z plane has a phase of −90°. The propagation of light 57 across from grating 33 to grating 35 advances the phase by 400°.

At grating 35, light 57 reflects to become light 59 with a phase of 505°. This is the step that differentiates between incident light polarized along 45° and 135° axes. Light 59 advances another 400° in phase while propagating back towards grating 33. Near grating 33, the component of light 59 polarized in the y-z component has a phase of 905°. Light 59 forward diffracts from grating 33 to form light 60 having a phase of 1005°, which is equivalent to 105°+180°.

The absorption by quantum well stack 37 is proportional to the vector sum of light 55 and 60. The two paths have a phase difference of 180°, and therefore the two paths interfere destructively. This leads to a negligible amount of photocurrent across quantum well stack 37. Therefore, the photocurrent across quantum well stack 37 changes for 45° polarized incident light compared to 135° polarized incident light.

The Present Invention

Figure 3:
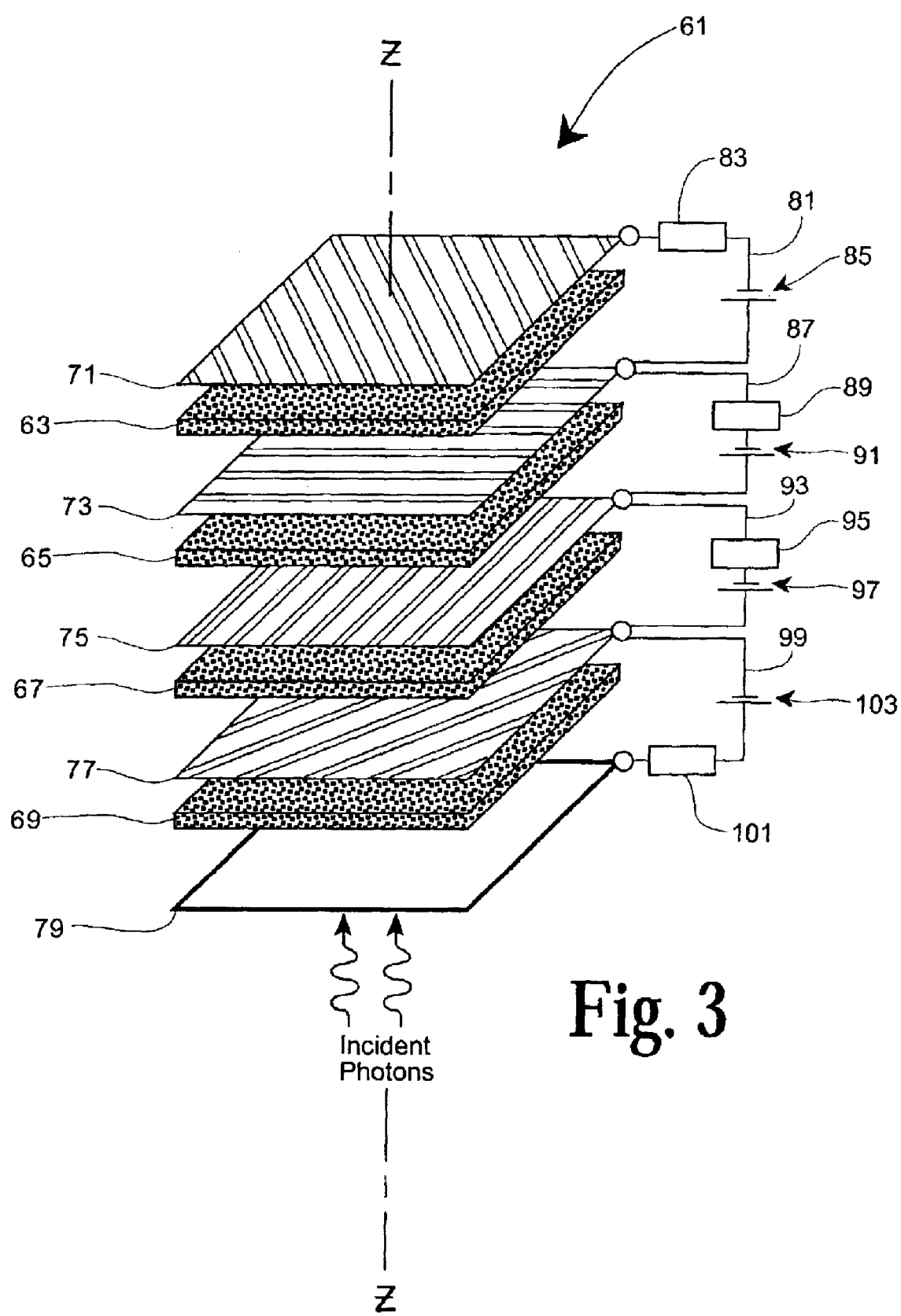
FIG. 3 is a schematic drawing of a quantum well photodetector of the present invention.

Polarimeter 61, an embodiment of the quantum well polarimeter of the present invention, is shown in the schematic drawing of FIG. 3. Polarimeter 61 comprises a single pixel. A polarimetric imaging device would most likely include a number of polarimeters 61. Polarimeter 61 includes quantum well stacks 63, 65, 67 and 69; linear gratings 71, 73, 75 and 77; and transparent substrate 79.

Grating 71 forms the top of polarimeter 61. Quantum well stack 63 is sandwiched in between gratings 71 and 73. Quantum well stack 65 is sandwiched in between gratings 73 and 75. Quantum well stack 67 is sandwiched in between gratings 75 and 77. Finally, quantum well stack 69 is sandwiched in between grating 77 and substrate 79. The linear gratings have differing orientations, defined by their rotation relative to grating 77 about the z-axis: grating 77 is at 0°, grating 75 is at 45°, grating 73 is at 90°, and grating 71 is at 135°. Infrared light is incident upon substrate 79.

N-doped semiconductor material (not shown for the sake of clarity) is inserted both above and below each of the quantum well stacks, i.e., in between each of the quantum well stacks and the adjacent gratings, except for quantum well stack 69, where the n-doped material is inserted in between the top of quantum well stack 69 and grating 57, and in between the bottom of quantum well stack 69 and substrate 79. The n-doped semiconductor material ensures ohmic contact to circuits 81, 87, 93 and 99.

Electrical circuit 81 includes current meter 83 and voltage source 85; and electrically connects gratings 71 and 73. Electrical circuit 87 includes current meter 89 and voltage source 91; and electrically connects gratings 73 and 75. Electrical circuit 93 includes current meter 95 and voltage source 97; and electrically connects gratings 75 and 77. Electrical circuit 99 includes current meter 101 and voltage source 103; and electrically connects gratings 77 and substrate 79.

The quantum wells, and thus the quantum well stacks, do not absorb light propagating in the z direction. The non-absorbed z-propagating light is reflected, diffracted and transmitted at each grating as a function of its polarization.

Linear gratings also have polarization-dependent physics. Grating efficiency is different for fast polarization (no magnetic field parallel to the grating's grooves) and slow polarization (no electric field parallel to the grating's grooves). For example, consider light with a 2.5 $\mu$m wavelength normally incident on a perfectly conducting grating with a 3 $\mu$m period, 1.5 $\mu$m grooves, and 0.75 $\mu$m depth: the fast polarization will be 14% reflected into the $0^{th}$ order, and 43% diffracted into the ±1 orders, and the slow-polarization will be 30% reflected into $0^{th}$ order and 35% diffracted into the ±1 orders. Unlike an isotropic dielectric material, linear gratings have polarization dependent reflection and transmission coefficients even at normal incidence. In addition, polarized light incident on a linear grating will have a relative phase shift between the diffracted fast and slow polarization components.

Interference among the multiple diffractions, refections and transmissions of light in polarimeter 61 translates the incident polarization into the amount of polarized light having a magnetic field lying entirely in the x-y plane, diffracted into the ±1 orders at each grating. Only the aforementioned ±1 orders are absorbed by the quantum wells.

The voltage bias across each circuit is individually adjusted, and the photocurrent in each circuit, as measured by the respective current meter, is proportional to the flux of light absorbed by the respective quantum well stack. The four photocurrents are thus a measure of the polarization of the incident light absorbed by each of the four quantum well stacks, respectively. The four photocurrents are linearly mapped to the four Stokes parameters, $S_0$, $S_1$, $S_2$, and $S_3$, which are defined as before:

$S_0 = I_0 + I_{90}$, $S_1 = I_0 - I_{90}$, $S_2 = I_{45} - I_{135}$, and $S_3 = I_R - I_L$ where $I_x$ is the measured intensity of the light after passing through a linear filter at an orientation of X degrees, and $I_R$ and $I_L$ are the measured intensities of the right or left circularly polarized fraction of the light.

The matrix that maps the four components of the incident light's Stokes vector Sin to the four photocurrents, $R_1$, $R_2$, $R_3$, and $R_4$ measured by current meters 83, 89, 95 and 101, respectively, is the polarization response matrix ("PRM") for polarimeter 61:

$$R_j = \sum_{k=1}^{N} PRM_{j,k} S_k^{In}$$

where the index j runs from 1 to the number of readouts $N_R$. For full polarimetric detection $N_R \geq 4$ is required. In matrix notation, the above equation is R=PRM*S.

To solve for the Stokes vector from the photocurrects, the PRM matrix must be inverted and left multiplied on each side of the above equation.

The degree of polarization, referred to as "DOP," of the light incident upon transparent substrate 79 of polarimeter 61 is again given by:

$$DOP = \sqrt{S_1^2 + S_2^2 + S_3^2}/S_0$$

Figure 4:
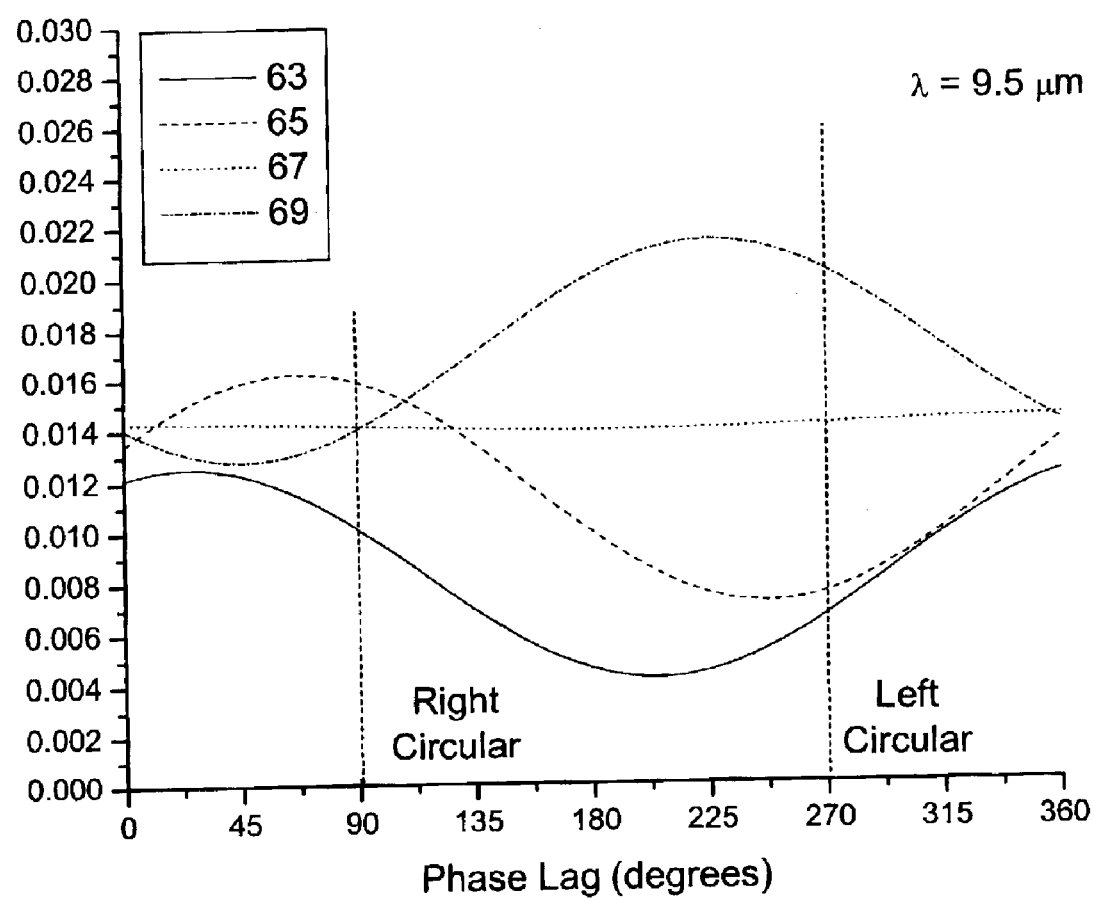
FIG. 4 is a graph of fraction of incident light absorbed by each of the four quantum well stacks of the present invention shown in FIG. 3, versus phase lag.

FIG. 4 is a graph showing, on its ordinate, the fraction of incident light absorbed in quantum well stacks 63, 65, 67 and 69, respectively, for 9.5 micron incident light. The abscissa shows the phase lag between 0° polarized incident light and 90° polarized incident light. The phase lag smoothly changes the polarization from 45° linear to right circular to 135° polarized to left circular. The graph demonstrates that the relative photocurrents from the four quantum well stacks provide a means to measure the polarization of incident light.

What is claimed is:

1. A polarimeter for polarimetrc imaging, comprising:
   a plurality of separate sheets of a material;
   each sheet being for generating a photocurrent responsive to a flux of photons being absorbed by the respective sheet, and also responsive to a polarization of the absorbed photons;
   a plurality of gratings separating the sheets from one another; and
   each of the gratings having a different rotation about a common axis.

2. The polarimeter defined in claim 1 further comprising means for measuring the photocurrent in each of the sheets.

3. The polarimeter defined in claim 2 further comprising:
   means for determining a polarization state for light impinging the polarimeter, from the photocurrent respectively measured by each of the measuring means.

4. The polarimeter defined in claim 3 further comprising means for applying a bias voltage to each of the sheets.

5. The polarimeter defined in claim 3 wherein:
   the polarization state is given by Stokes parameters; and
   the Stokes parameters are $S_0$, $S_1$, $S_2$, and $S_3$; where $S_0 = I_0 + I_{90}$, $S_1 = I_0 - I_{90}$, $S_2 = I_{45} - I_{135}$, and $S_3 = I_R - I_L$ where $I_x$ is the measured intensity of the light after passing through a linear filter at an orientation of X degrees, and $I_R$ and $I_L$ are the measured intensities of the right or left circularly polarized fraction of the light.

6. The polarimeter defined in claim 1 wherein:
   one of the sheets lies adjacent to a transparent substrate; and
   one of the gratings forms a top of the polarimeter, whereby light impinges and passes through the substrate.

7. The polarimeter defined in claim 6 wherein the grating forming the top of the polarimeter is reflective.

8. The polarimeter defined in claim 1 wherein:
   each of the sheets is comprised of a quantum well stack; and
   each of the quantum well stacks is comprised of a plurality of quantum well layers.

9. The polarimeter defined in claim 8 wherein the gratings are linear gratings.

10. The polarimeter defined in claim 9 wherein:
    the plurality of quantum well layers is comprised of four quantum well layers; and
    the plurality of linear gratings is comprised of four linear gratings.

11. The polarimeter defined in claim 10 wherein the respective rotations of the four linear gratings are 0°, 45°, 90°, and 135°.

12. The polarimeter defined in claim 8 wherein each of the sheets is comprised of a stack of alternating layers of GaAs and $Al_xGa_{1-x}As$.

13. The polarimeter defined in claim 1 wherein:
    the polarimeter comprises a pixel; and
    a plurality of the pixels in a focusing plane comprises an imaging apparatus.

14. The polarimeter defined in claim 1 wherein the gratings are linear gratings.

15. A method for polarimetric imaging comprisng the steps of:
    passing portions of incident light of varying wavelengths through a plurality of quantum well stacks that alternate with intersperced linear gratings that have been rotated to differing angles, respectively, about a common axis of rotation; and
    determining Stokes parameters from the quantum well stacks.

16. The polarimetric imaging method recited in claim 15 wherein:
    the step of determining the Stokes parameters includes measuring a photocurrent generated by the portion of the incident light being absorbed by each of the quantum well layers, respectively.

* * * * *